US012649690B2

(12) United States Patent
Campanari et al.

(10) Patent No.: US 12,649,690 B2
(45) Date of Patent: Jun. 9, 2026

(54) METHOD FOR THE COOLING AND HEAT RECOVERY FROM MATERIALS AT VERY HIGH TEMPERATURE

(71) Applicant: CICSA S.R.L., Lecco (IT)

(72) Inventors: Stefano Campanari, Lecco (IT); Marco Campanari, Lecco (IT)

(73) Assignee: CICSA S.R.L., Lecco (IT)

( * ) Notice: Subject to any disclaimer, the term of this patent is extended or adjusted under 35 U.S.C. 154(b) by 346 days.

(21) Appl. No.: 18/552,542

(22) PCT Filed: Mar. 25, 2022

(86) PCT No.: PCT/IB2022/052751
§ 371 (c)(1),
(2) Date: Sep. 26, 2023

(87) PCT Pub. No.: WO2022/208260
PCT Pub. Date: Oct. 6, 2022

(65) Prior Publication Data
US 2024/0174564 A1 May 30, 2024

(30) Foreign Application Priority Data

Mar. 29, 2021 (IT) ........................ 102021000007661

(51) Int. Cl.
*C04B 7/47* (2006.01)
*C04B 7/147* (2006.01)
(52) U.S. Cl.
CPC .............. *C04B 7/475* (2013.01); *C04B 7/147* (2013.01)
(58) Field of Classification Search
CPC ................................. C04B 7/475; C04B 7/147
See application file for complete search history.

(56) References Cited

U.S. PATENT DOCUMENTS 3,397,657 A * 8/1968 Tada ........................ F23G 5/30
110/165 A
4,424,766 A * 1/1984 Boyle ..................... F23C 10/16
122/4 D
(Continued)

FOREIGN PATENT DOCUMENTS

CN 109336149 A 2/2019
EP 0882687 A1 12/1998
(Continued)

OTHER PUBLICATIONS

WO2014170729A1 mt (Year: 2014).*
(Continued)

*Primary Examiner* — Gordon A Jones
(74) *Attorney, Agent, or Firm* — Lucas & Mercanti, LLP

(57) ABSTRACT

A method for the cooling of and heat recovery from materials at very high temperatures is disclosed. The method includes a) conveying material at very high temperature into a mixing system, b) transporting the material exiting the mixing system inside a continuous-flow channel, c) recovering heat from the transported material, d) feeding a flow of material exiting at low temperature from the continuous-flow channel to a flow dividing system, e) recovering a part of the low-temperature material exiting the flow dividing system, f) moving the part of recovered material at low temperature by means of a moving and recirculating system, and g) conveying the material at low temperature for mixing with the material at the very high temperature in the mixing system.

10 Claims, 1 Drawing Sheet

(56) References Cited

U.S. PATENT DOCUMENTS

| | | | | |
|---|---|---|---|---|
| 4,700,636 | A * | 10/1987 | Vogt | B01J 8/005 |
| | | | | 209/139.1 |
| 4,913,064 | A * | 4/1990 | Vollhardt | F23M 5/00 |
| | | | | 110/229 |
| 5,501,721 | A * | 3/1996 | Edlinger | C21B 5/04 |
| | | | | 588/404 |
| 5,944,870 | A * | 8/1999 | Edlinger | C21B 3/04 |
| | | | | 75/434 |
| 6,012,918 | A | 1/2000 | Doumet | |
| 6,364,929 | B1 * | 4/2002 | Edlinger | C21B 3/06 |
| | | | | 75/453 |
| 6,391,105 | B1 | 5/2002 | Oates et al. | |
| 6,488,765 | B1 * | 12/2002 | Tseng | F27B 7/42 |
| | | | | 106/761 |
| 6,491,751 | B1 * | 12/2002 | Watson | C04B 7/421 |
| | | | | 106/767 |
| 7,128,004 | B2 * | 10/2006 | Miyoshi | F23G 5/30 |
| | | | | 110/101 R |
| 7,549,859 | B2 * | 6/2009 | Dupuis | F27B 15/10 |
| | | | | 432/15 |
| 8,038,791 | B2 * | 10/2011 | Piniecki | F27B 7/20 |
| | | | | 106/789 |
| 9,175,224 | B2 * | 11/2015 | Lee | C10J 3/22 |
| 2005/0026070 | A1 * | 2/2005 | Lee | G03F 7/0397 |
| | | | | 430/270.1 |
| 2008/0053339 | A1 | 3/2008 | Piniecki | |
| 2011/0113987 | A1 | 5/2011 | Jorget et al. | |
| 2011/0140459 | A1 * | 6/2011 | Fuentes Samaniego | |
| | | | | F27D 17/10 |
| | | | | 60/645 |
| 2018/0127312 | A1 * | 5/2018 | Leibinger | B01D 53/002 |
| 2023/0159388 | A1 * | 5/2023 | Sceats | F27B 7/2016 |
| | | | | 432/117 |
| 2024/0018039 | A1 * | 1/2024 | Stoffel | C04B 7/432 |
| 2024/0361074 | A1 * | 10/2024 | Piringer | C04B 7/475 |
| 2025/0011233 | A1 * | 1/2025 | Mersmann | C04B 7/4415 |

FOREIGN PATENT DOCUMENTS

| | | | | | |
|---|---|---|---|---|---|
| EP | 4542155 | A1 * | 4/2025 | | F27D 17/20 |
| GB | 2525007 | A | 10/2015 | | |
| JP | S61219746 | A | 9/1986 | | |
| WO | WO-2005026070 | A1 * | 3/2005 | | F27D 17/20 |
| WO | WO-2007141307 | A2 * | 12/2007 | | F27D 15/0213 |
| WO | WO-2008119733 | A2 * | 10/2008 | | F26B 3/205 |
| WO | WO-2014170729 | A1 * | 10/2014 | | C04B 7/475 |

OTHER PUBLICATIONS

WO_2008119733 (Year: 2008).*

EP4542155A1 (Year: 2023).*

Reuter et al. Recycling and environmental issues of metallurgical slags and salt fluxes (Year: 2004).*

Huang et al. Potential for Serious Environmental Threats from Uncontrolled Coprocessing of Wastes in Cement Kilns (Year: 2012).*

Seungshik Park a, *, Geun-Hye Yu a, Min-Suk Bae; Effects of combustion condition and biomass type on the light absorption of fine organic aerosols from fresh biomass burning emissions over Korea* (Year: 2020).*

International Search Report and Written Opinion for Corresponding International Application No. PCT/IB2022/052751, 10 pages, May 11, 2022.

Office Action for Corresponding Chinese Patent Application No. 202280027138.3, Sep. 29, 2025, 10 pages.

Office Action for Corresponding Japanese Patent Application No. 2023-560500, Oct. 1, 2025, 11 pages.

* cited by examiner

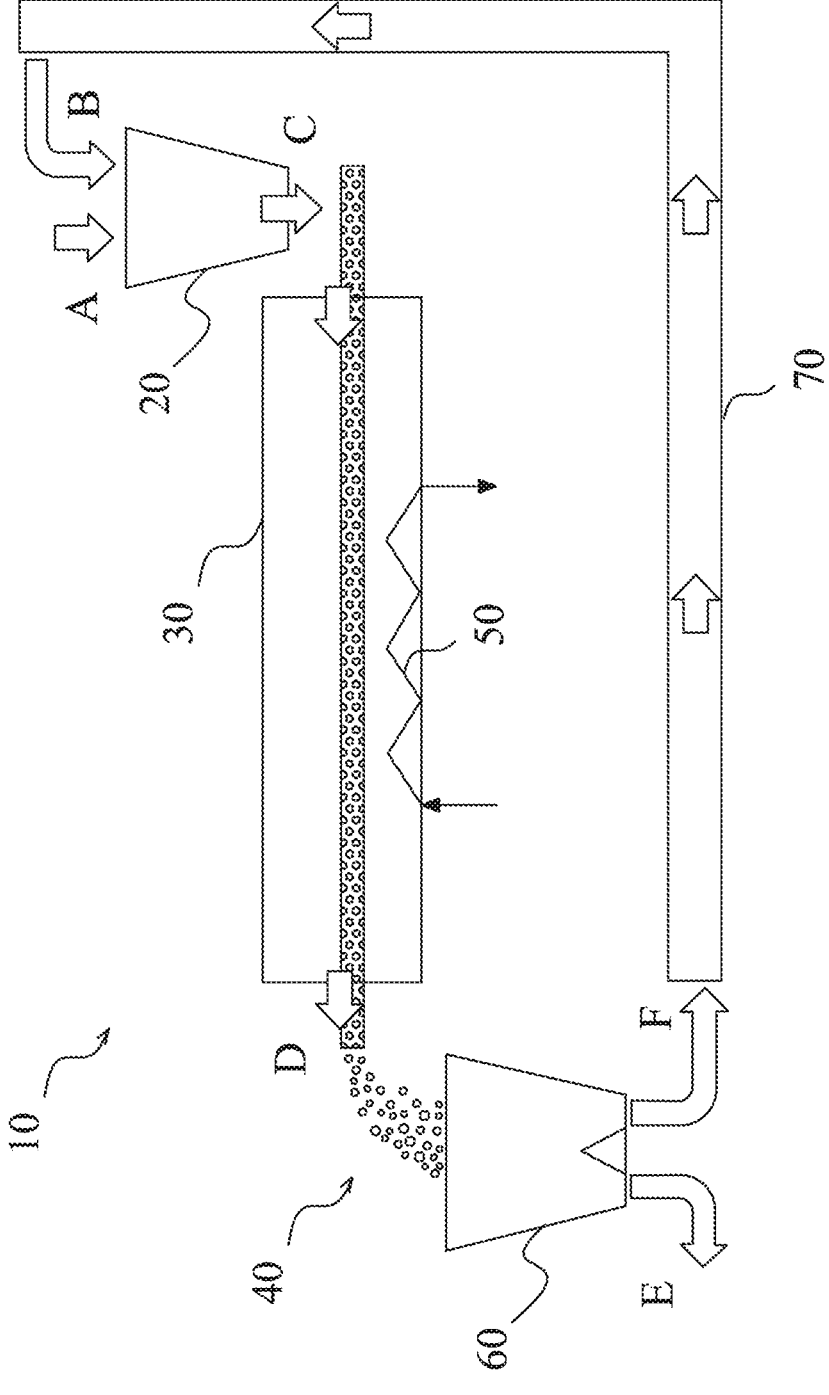

METHOD FOR THE COOLING AND HEAT RECOVERY FROM MATERIALS AT VERY HIGH TEMPERATURE

CROSS-REFERENCE TO RELATED APPLICATIONS

This application is a 371 of PCT/IB2022/052751, filed Mar. 25, 2022, which claims the benefit of Italian Patent Application No. 102021000007661, filed Mar. 29, 2021.

FIELD OF THE INVENTION

The present invention refers to a method for the cooling and heat recovery from materials at very high temperature.

In particular, the present invention refers to a method for the cooling and heat recovery of materials at very high temperature, such as the clinker of the cement production cycle or slags resulting from industrial processes like the steel production cycle or like the slags and ashes resulting from the coal combustion, waste and other heavy fuels.

BACKGROUND OF THE INVENTION

In several types of industrial processes, materials at very high temperature are produced which must be cooled to allow their subsequent use, storage or management. Traditionally, in the cement production cycle, clinker is produced at high temperature (typically about 1450° C.) inside rotary drum furnaces. The clinker is then unloaded from the furnace and must be cooled. The clinker's cooler is part of the cement production line and affects the efficiency and cost-effectiveness of the plant, with the dual purpose of recovering heat from the cooling of the clinker in order to return it to the rest of the cement cooking plant and to allow to reduce the clinker's temperature to an adequate level for the transport and subsequent use equipment located downstream of the furnace. In particular, in the known art, the cooler generally uses moving grates for the moving of the material and the heat is recovered by blowing air into the cooler through the moving grates and directly inside the hot material, thus obtaining hot air which is then used for combustion processes and/or for the preheating of the materials entering the cement production cycle.

The cooling of the clinker must be quick to improve the mineralogical and grindability characteristics and for a better reactivity of the cement produced. However, the high temperatures involved, the extreme abrasiveness of the clinker, the variety of grain size with which it is produced in the furnace, the possibility that in some steps the clinker exits the furnace in liquid phase instead of solid phase, make the clinker's cooler a very expensive component subject to frequent onerous maintenance services.

The possible presence of liquid clinker may damage mechanical apparatuses and block the passage channels of the cooling air.

Moreover, problems of insufficient air availability and, therefore, insufficient cooling of the clinker and overheating and damage of the mechanical parts of the cooler, which are in contact with the material, can occur. The cooling system, therefore, has room for improvement from the point of view of achieving a quicker and more reliable cooling, in addition to being less economically onerous, and also obtaining an energy recovery which is thermodynamically more favourable than the simple hot air production.

On the contrary, referring to the case of the steel production cycle, a step is traditionally provided in which the liquid steel is formed or transformed inside furnaces and containers in which a molten slag containing various types of materials (e.g. silicon oxides), which must be separated from the liquid steel, is separated. For this purpose, the slag is traditionally allowed to cool outdoors. This method allows only the recovery of the slag as an inert material.

In fact, the solid slag, suitably ground, can be usefully used as filling material in civil works, such as road sub-bases.

However, the open-air cooling of the slag is by no means an optimal method, neither from an energy nor environmental point of view.

In fact, when it is unloaded, the liquid slag comprises a large amount of thermal energy, reaching temperatures higher than 1400° C. In this regard, it is estimated that the slag contains therein as much as 6% of the thermal energy fed altogether into the steel production cycle. Moreover, while it cools in the open air, the slag releases fumes and vapours into the environment which, as well as dissipating in turn the thermal energy, are also polluting.

The treatment of the slag is therefore another of the problems that the steel industry must solve, in particular to improve the energy efficiency of the steel mills.

At the same time, as in many other industrial sectors, the aim is to limit the emission of pollutants as much as possible in order to favour the environmental issues.

Overall, reliable and effective solutions for the management of cooling and heat recovery from the hot slag have not yet been implemented in the implementation practice.

It should still be noted that problems of cost, maintenance charges and improvability of the heat recovery qualitatively analogous to those in the case of clinker for the production of cement or slags for the production of steel, can also be found in other sectors of application, such as the case of the ashes from the combustion of coal, waste or other heavy fuels.

Object of the present invention is to solve the above-mentioned technical problems by means of a method for the cooling and heat recovery from materials at very high temperature, which increases the overall energy efficiency of the industrial process in which such materials are produced.

Another object of the invention is to provide a method for the cooling and heat recovery from materials at very high temperature which allows a fast and quick cooling of the material entering, in order to improve its characteristics and to reduce its dimensions, the costs and wear and tear problems of the mechanical parts in contact with the hotter material.

Another object of the invention is to provide a method for the cooling and heat recovery from materials at very high temperature which is environmentally friendly.

A further object of the invention is to provide a practical and cheap solution to the above-mentioned problems.

BRIEF DESCRIPTION OF THE INVENTION

These purposes are achieved by a method for the cooling and heat recovery from materials at very high temperature, where the aforesaid method comprises at least the following steps of:

conveying material at very high temperature into a mixing system;

transporting the aforesaid material exiting the mixing system inside a continuous-flow channel;

carrying out a step of heat recovery from the transported material;

feeding a flow of material exiting at low temperature from the aforesaid continuous-flow channel to a flow dividing system;

recovering a part of the low-temperature material exiting the aforesaid flow dividing system;

moving the part of recovered material at low temperature by means of a moving and recirculating system; and conveying the recovered material at low temperature for mixing it with the material at very high temperature in the mixing system.

The advantages of this implementation include the fact that it is able to bring some material at very high temperature very quickly from a temperature between 1,300° C. and 1,600° C. (typical temperature range of the clinker production in the cement production cycle or slag production in the steel production cycle) to a much lower temperature between 600 and 1000° C., by mixing it with colder material, thus resulting in the quick solidification of any liquid part present when entering. Additionally, it is able to achieve a subsequent cooling to a temperature low enough to allow an easy moving and management of the material exiting, between 50° C. and 400° C. Furthermore, by simultaneously using the enthalpy of the material to recover energy with production of useful heat through a cooling process that can be a closed circuit one, and by using any heat-transfer fluid (e.g. by using water and generating medium or high pressure steam that is suitable for subsequent energy uses), this increases overall energy efficiency.

Further characteristics of the invention can be deduced from the dependent claims.

BRIEF DESCRIPTION OF THE FIGURE

Further characteristics and advantages of the invention will become clear from reading the following description provided by way of non-limiting example, with the aid of the FIGURE depicted in the accompanying drawing, wherein:

FIG. 1 depicts a schematic view of a plant configured to implement the method according to an implementation of the invention.

DETAILED DESCRIPTION OF THE INVENTION

The present invention will now be described with particular reference to the accompanying FIGURE.

In particular, FIG. 1 depicts a schematic view of a plant, generally denoted by the reference numeral 10 and configured to implement the method according to an implementation of the invention.

First of all, the plant 10 comprises a mixing system 20 which is configured to receive both a material A at a very high temperature and a recirculated material B that is solid and at a low temperature, i.e. at a temperature between 100° C. and 400° C.

In particular, the material A at very high temperature considered by way of example can be steel mill slag at a temperature between 1,300° C. and 1,600° C. (temperature at which this type of slag is melted and, therefore, in liquid phase), whereas the recirculated material B is solid slag.

In a preferred embodiment, the mixing system 20 can comprise a rotary and/or vibrating drum, with a horizontal or inclined axis, within which an optimal mixing of the material A at very high temperature with the recirculated material B takes place once they have flowed into such rotary drum.

Moreover, the mixing system 20, in addition to or in place of the above-mentioned rotary drums, can further comprise chutes, cyclone or funnel chambers, tubs or combinations thereof.

Although, by way of example, a mixing system 20 in which only one inflow point of the material A at very high temperature and only one inflow point of the recirculated material B is visible within the mixing system 20, has been disclosed herein, there may of course be more than one inflow point of the material A at very high temperature and/or more than one inflow point of the recirculated material B within such mixing system 20.

From the mixing system 20, a mixed material C exits at an intermediate temperature, e.g. between 600° ° C. and 1000° C.

The mixed material C may be in the liquid, solid state or in liquid and solid mixture, depending on the characteristics of the entering material A.

The plant 10 further comprises a continuous-flow channel 30 for transporting the material at intermediate temperature exiting the mixing system 20.

The continuous-flow channel 30 can be selected from a cooled-tube device, of the fixed or rotary type, a pneumatic-flow device, a vibrating-table device or a drag-chain device. Other types of continuous-flow transport of the material at intermediate temperature, known in the art, may equally be provided.

The mixing system 20 depicted herein by way of example, as consisting of a single point for feeding the mixed material C into the continuous-flow channel 30, may alternatively have multiple points for feeding the mixed material C onto said continuous-flow channel 30 or other equivalent continuous-flow transport means.

A step of heat recovery is also carried out inside the continuous-flow channel 30.

The step of heat recovery from the material transported in the continuous-flow channel 30 can be carried out by means of a closed-circuit exchanger 50 or by means of an open-circuit blown-air exchanger or a mixed exchanger.

A flow of material D at low temperature therefore exits the continuous-flow channel 30 and is fed to a flow dividing system 60.

The flow dividing system 60 can comprise mechanical diverters, chutes, sieves, distribution chambers or combinations thereof.

Two flows of material at low temperature exit the flow dividing system 60.

In particular, a first part of material E at low temperature and which has therefore completed the described cooling process, and a second part of material F which is instead recovered by means of a moving and recirculating system 70, exit the flow dividing system 60.

Finally, the material at low temperature, recovered when exiting the flow dividing system 60, is returned by the moving and recirculating system 70 toward the inlet of the mixing system 20 (see also the arrow B in FIG. 1) for the mixing thereof with the material at very high temperature.

Specifically, the moving and recirculating system 70 for moving and recirculating the solid material at low temperature can comprise a system selected from a pneumatic, auger or drag chain conveying system.

An example of thermal and energy balance is now presented for the case of a material entering with characteristics similar to the steel mill slag, with liquid inflow and solid outflow.

Example 1

The material A at very high temperature entering, in the liquid state, the mixing system 20 has a mass flow rate m equal to m=10 t/h, a temperature T equal to T=1,400° C. and a specific enthalpy h equal to h=1536 KJ/kg.

The recirculated material B entering the mixing system 20 has a mass flow rate m equal to m=11 t/h, a temperature T equal to T=250° C. and a specific enthalpy h equal to h=192 KJ/kg.

The mixed material C exiting the mixing system 20 has a mass flow rate m equal to m=21 t/h, a temperature T equal to T=950° C. and a specific enthalpy h equal to h=836 KJ/kg.

The power P recoverable from the step of heat recovery from the material transported inside the continuous-flow channel 30 is equal to about 3.7 MW.

The material at low temperature exiting the continuous-flow channel 30 obviously still has a mass flow rate m equal to m=21 t/h, a temperature T equal to T=250° C. and a specific enthalpy h equal to h=192 KJ/kg.

This material is divided by the flow dividing system 60 into a first part of material E at low temperature and which has therefore completed the described cooling process, i.e. a flow of material equal to m=10 t/h and that has a temperature T equal to T=250° C. and a specific enthalpy h equal to h=192 KJ/kg, and into a second part of material F which is instead recovered by means of a moving and recirculating system 70, i.e. a flow of material equal to m=11 t/h and that has a temperature T equal to T=250° C. and a specific enthalpy h equal to h=192 KJ/kg.

The total steady-state effect of the described system is therefore to bring the material A, having a hourly flow equal to M=10 t/h, from a temperature equal to T=1,400° C. to a temperature equal to T=250° C. and from a specific enthalpy h equal to h=1536 KJ/kg to a specific enthalpy h equal to h=192 KJ/kg.

Modifications or improvements that are dictated by contingent or particular reasons, without thereby departing from the scope of the invention, may be made to the invention as described herein.

The invention claimed is:

1. A method for the controlled cooling of and heat recovery from materials at a high temperature, comprising of:
   a)—conveying high-temperature material at the high temperature into a mixing system, wherein the high temperature is between 1,300° C. and 1,600° C.;
   b)—transporting mixed material exiting the mixing system inside a continuous flow channel;
   c)—carrying out a step of heat recovery from the transported mixed material;
   d)—feeding a flow of the mixed material exiting at a low temperature from the continuous flow channel to a flow dividing system configured to divide the mixed material exiting at the low temperature into at least a recovered portion of the mixed material and a discard portion of the mixed material;

e)—recovering the recovered portion of the mixed material exiting the flow dividing system;
   f)—moving the recovered portion of the mixed material at the low temperature by means of a moving and recirculating system adapted to re-introduce exclusively the recovered portion of the mixed material for direct mixing with the high-temperature material; and
   g)—conveying the recovered portion of the mixed material at low temperature and mixing the recovered portion of the mixed material at a temperature between 50° C. and 400° C. with the high-temperature material at the high temperature in the mixing system, thereby reducing the temperature of the high-temperature material.

2. The method according to claim 1, wherein the mixing system is selected from the group consisting of rotary and/or vibrating drums, chutes, cyclone or funnel chambers, tubs and combinations thereof.

3. The method according to claim 1, wherein the continuous flow channel is a device selected from the group consisting of a cooled-tube device of the fixed or rotary and/or vibrating type, a pneumatic-flow device, a vibrating-table device and a drag-chain device.

4. The method according to claim 1, wherein the step of heat recovery from the mixed material transported in the continuous flow channel is carried out by means of a closed-circuit exchanger or by means of an open-circuit air blast exchanger, or a mixed exchanger.

5. The method according to claim 1, wherein the flow dividing system is selected from the group consisting of mechanical diverters, chutes, sieves, distribution chambers and combinations thereof.

6. The method according to claim 1, wherein the moving and recirculating system for moving and recirculating the recovered portion of the mixed material at low temperature is a system selected from the group consisting of a pneumatic conveying system, an auger conveying system, and a drag chain conveying system.

7. The method according to claim 1, wherein the high-temperature material at the very high temperature is steel mill molten slag.

8. The method according to claim 1, wherein the high-temperature material is clinker.

9. The method according to claim 1, wherein the mixing of the recovered portion of the mixed material with the high-temperature material is performed so that the mixed material exiting the mixing system is at a temperature between 600° C. and 1,000° C.

10. The method according to claim 1, wherein the step of heat recovery is carried out by an exchanger using a heat-transfer fluid that recovers heat from the material in the continuous flow channel.

* * * * *